(12) United States Patent
Tsukamoto et al.

(10) Patent No.: US 9,847,680 B2
(45) Date of Patent: Dec. 19, 2017

(54) POWER SUPPLY APPARATUS AND METHOD THEREOF

(71) Applicant: CANON KABUSHIKI KAISHA, Tokyo (JP)

(72) Inventors: Nobuyuki Tsukamoto, Tokyo (JP); Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 15/002,010

(22) Filed: Jan. 20, 2016

(65) Prior Publication Data

US 2016/0218568 A1 Jul. 28, 2016

(30) Foreign Application Priority Data

Jan. 22, 2015 (JP) .................................. 2015-010665

(51) Int. Cl.

| | | |
|---|---|---|
| H01F 27/42 | (2006.01) | |
| H01F 37/00 | (2006.01) | |
| H01F 38/00 | (2006.01) | |
| H02J 50/80 | (2016.01) | |
| H02J 50/10 | (2016.01) | |
| H02J 7/02 | (2016.01) | |

(52) U.S. Cl.
CPC .............. H02J 50/80 (2016.02); H02J 7/025 (2013.01); H02J 50/10 (2016.02)

(58) Field of Classification Search
USPC .......................................... 307/104; 713/300
See application file for complete search history.

(56) References Cited

U.S. PATENT DOCUMENTS

| | | | | |
|---|---|---|---|---|
| 9,461,479 B2* | 10/2016 | Chae | ........................ | H02J 5/005 |
| 2013/0290747 A1* | 10/2013 | Miwa | ........................ | G06F 1/26 |
| | | | | 713/300 |
| 2016/0064994 A1* | 3/2016 | Ku | ........................... | H02J 7/025 |
| | | | | 307/104 |
| 2016/0243955 A1* | 8/2016 | Yoshida | ................ | B62D 15/028 |
| 2016/0355095 A1* | 12/2016 | Okamoto | ............ | B60L 11/1803 |
| 2017/0033605 A1* | 2/2017 | Nakamura | .............. | H02J 17/00 |
| 2017/0066336 A1* | 3/2017 | Okamoto | .............. | B60L 11/182 |
| 2017/0179933 A1* | 6/2017 | Garrity | ..................... | H03J 3/20 |
| 2017/0182903 A1* | 6/2017 | Kwasnick | ........... | B60L 11/1829 |
| 2017/0203656 A1* | 7/2017 | Okamoto | ................ | H02J 50/80 |

FOREIGN PATENT DOCUMENTS

JP        2008-113519 A        5/2008

\* cited by examiner

Primary Examiner — Adam Houston
(74) Attorney, Agent, or Firm — Cowan, Liebowitz & Latman, P.C.

(57) ABSTRACT

A power supply apparatus includes a power supply unit that wirelessly supplies power to an electronic device, a communication unit that transmits information related to the power supply apparatus to the electronic device, transmits information for requesting the electronic device for transmitting information related to the electronic device, when a predetermined time has elapsed after the information related to the power supply apparatus is transmitted to the electronic device, and receives the information related to the electronic device from the electronic device; and a control unit that uses the information related to the electronic device to control power to be wirelessly supply to the electronic device, after the information related to the electronic device is received from the electronic device.

11 Claims, 8 Drawing Sheets

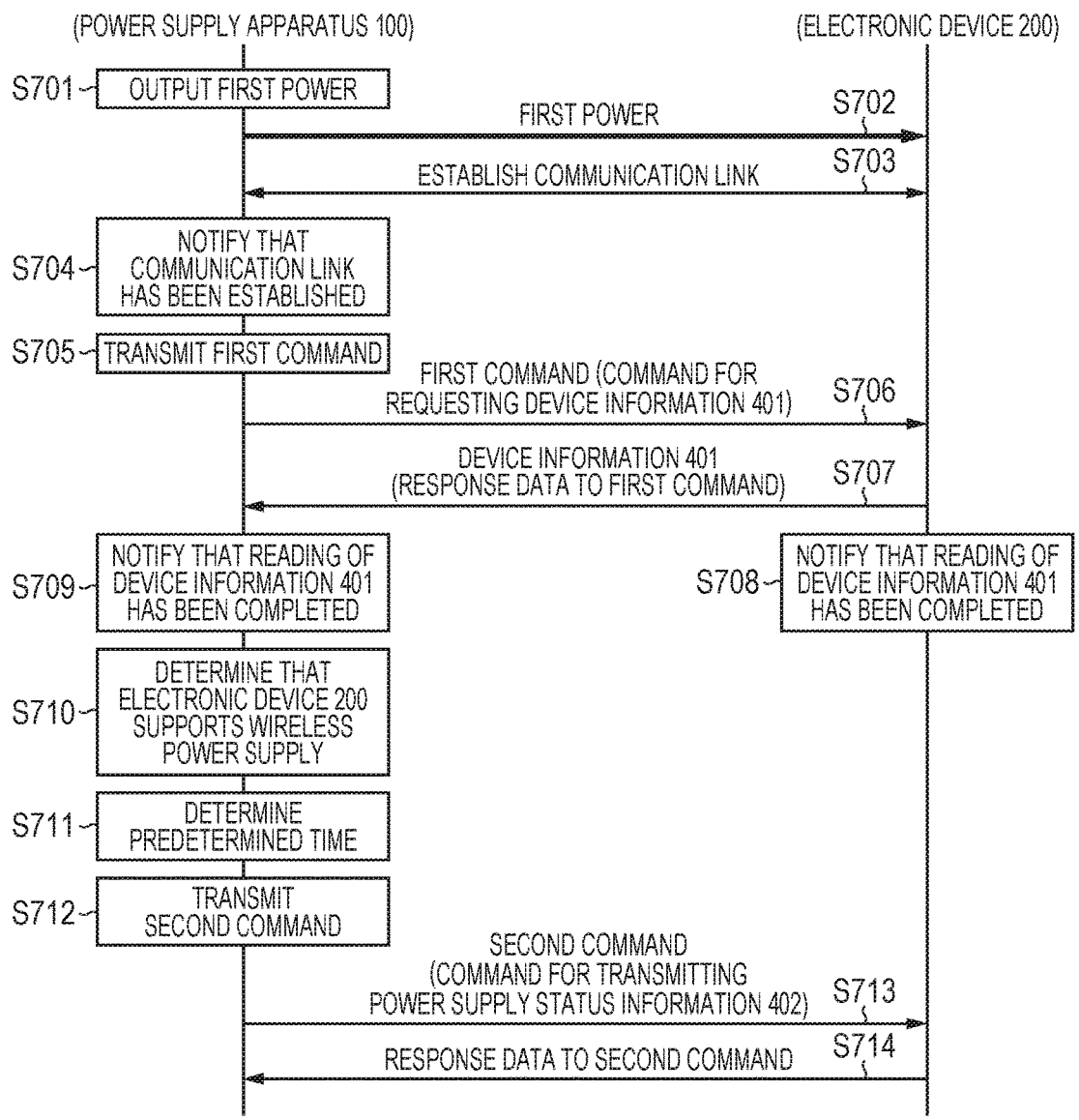

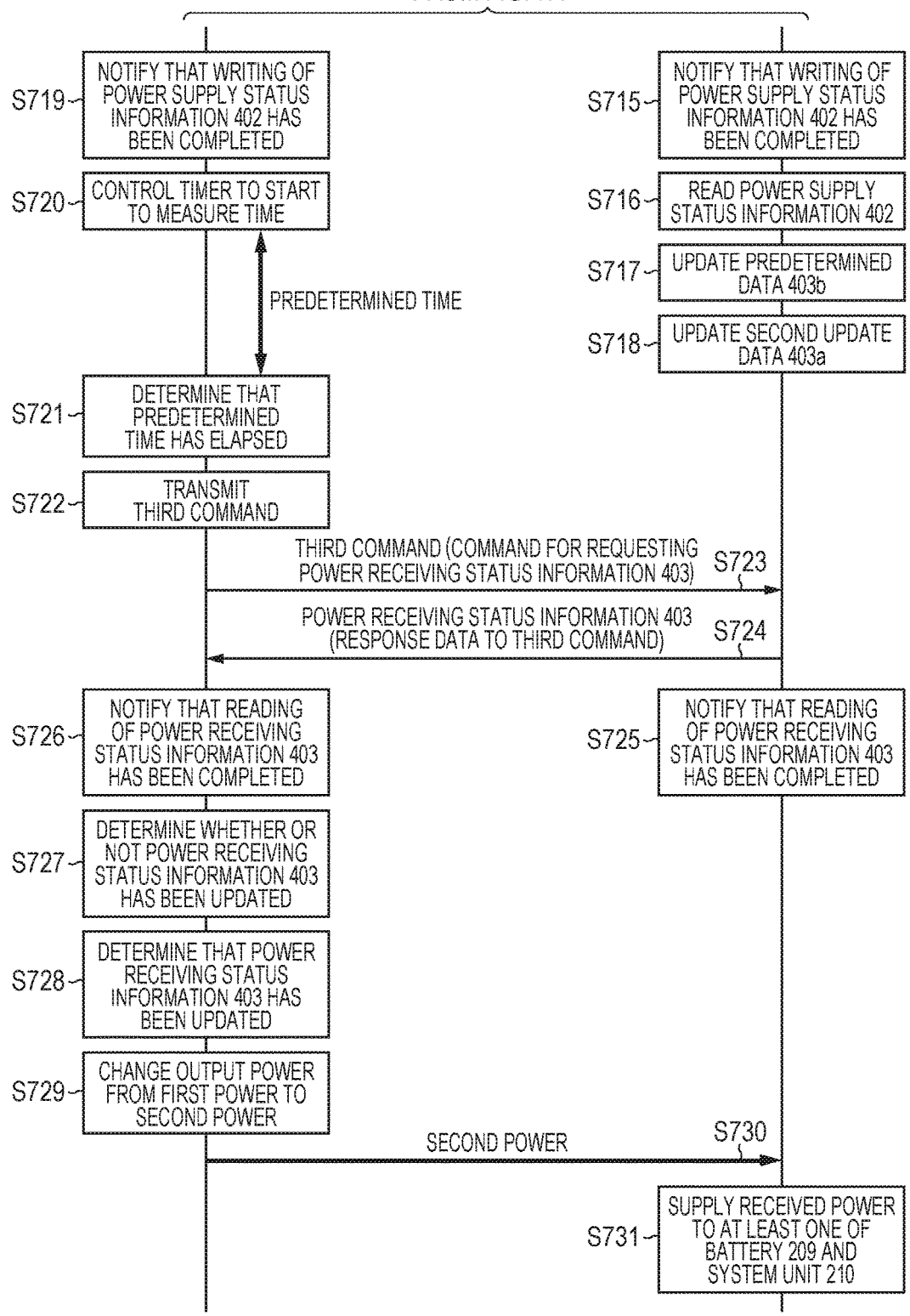

POWER SUPPLY APPARATUS AND METHOD THEREOF

BACKGROUND

Field of the Invention

The present invention relates to a power supply apparatus that wirelessly supplies power and a method of wirelessly supplying power.

Description of the Related Art

In recent years, there is known a power supply system that wirelessly transmits power without connection through a connector. With regard to such a power supply system, there is known a power supply apparatus configured to conduct a data communication for transmitting a command to an electronic device and to transmit power to the electronic device through use of the same antenna (Japanese Patent Application Laid-Open No. 2008-113519).

In such a power supply system, the power supply apparatus is demanded to control power supply to an electronic device based on a status of the electronic device. In that case, it is desired that the electronic device periodically detect the status of the electronic device and that the power supply apparatus periodically acquire information indicating the status of the electronic device detected by the electronic device from the electronic device.

However, in the above-mentioned power supply system, a relationship between a timing at which the electronic device updates the information indicating the status of the electronic device and a timing at which the power supply apparatus acquires the information indicating the status of the electronic device from the electronic device is not taken into consideration. Therefore, the power supply apparatus sometimes acquires the information indicating the status of the electronic device from the electronic device before the information indicating the status of the electronic device is updated. In this case, the information indicating the status of the electronic device which has been acquired from the electronic device may not be correct as information indicating a current status of the electronic device. This may cause a situation in which desired power cannot be supplied to the electronic device even when the power supply apparatus controls power to be supply to the electronic device on the basis of the information indicating the status of the electronic device which has been acquired from the electronic device.

SUMMARY

According to an aspect of the present invention, a timing to acquire information indicating a status of an electronic device from the electronic device can be controlled when power is wirelessly supplied to the electronic device.

According to an aspect of the present invention, there is provided a power supply apparatus including: a power supply unit that wirelessly supplies power to an electronic device; a communication unit that transmits information related to the power supply apparatus to the electronic device, transmits information for requesting the electronic device for transmitting information related to the electronic device, when a predetermined time has elapsed after the information related to the power supply apparatus is transmitted to the electronic device, and receives the information related to the electronic device from the electronic device; and a control unit that uses the information related to the electronic device to control power to be wirelessly supply to the electronic device, after the information related to the electronic device is received from the electronic device.

According to an aspect of the present invention, there is provided a method including: wirelessly supplying power from a power supply apparatus to an electronic device; transmitting information related to the power supply apparatus to the electronic device; transmitting information for requesting the electronic device for transmitting information related to the electronic device, when a predetermined time has elapsed after the information related to the power supply apparatus is transmitted to the electronic device; receiving the information related to the electronic device from the electronic device; and using the information related to the electronic device to control power to be wirelessly supply to the electronic device, after the information related to the electronic device is received from the electronic device.

According to an aspect of the present invention, there is provided a non-transitory storage medium that stores a program for causing a computer to execute a method, the method including: wirelessly supplying power from a power supply apparatus to an electronic device; transmitting information related to the power supply apparatus to the electronic device; transmitting information for requesting the electronic device for transmitting information related to the electronic device, when a predetermined time has elapsed after the information related to the power supply apparatus is transmitted to the electronic device; receiving the information related to the electronic device from the electronic device; and using the information related to the electronic device to control power to be wirelessly supply to the electronic device, after the information related to the electronic device is received from the electronic device.

Further features and aspects of the present invention will become apparent from the following description of exemplary embodiments.

BRIEF DESCRIPTION OF THE DRAWINGS

FIGS. 7A and 7B are sequence charts for illustrating an example of an operation of the power supply apparatus 100 and an operation of the electronic device 200 in the first exemplary embodiment.

DESCRIPTION OF THE EMBODIMENTS

Exemplary embodiments, features, and aspects of the present invention will be described below with reference to the drawings.

First Exemplary Embodiment

Figure 1:
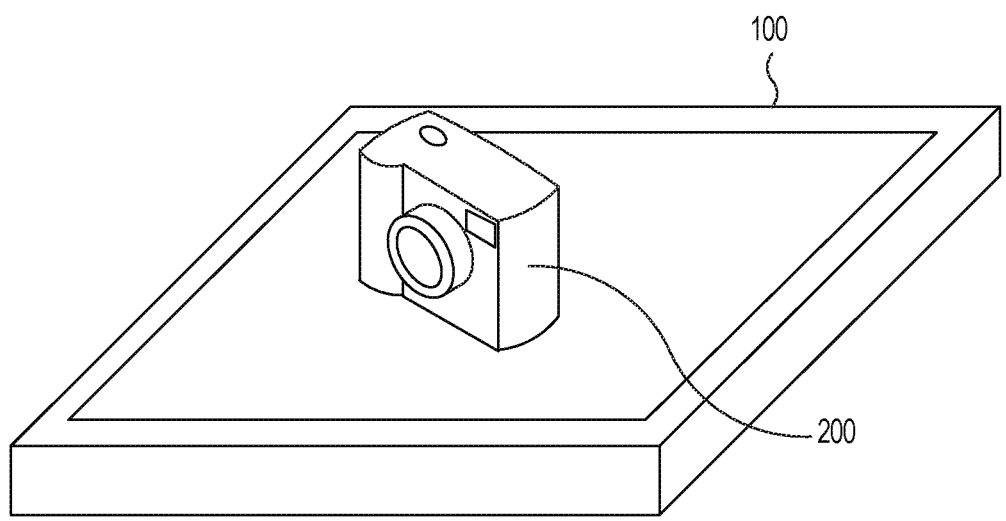
FIG. 1 is a diagram for illustrating an example of a power supply system in a first exemplary embodiment.

Now, a first exemplary embodiment is described in detail with reference to the accompanying drawings. As illustrated in FIG. 1, a power supply system in the first exemplary embodiment includes a power supply apparatus 100 and an electronic device 200. In the power supply system in the first exemplary embodiment, when the electronic device 200 exists within a predetermined range, the power supply apparatus 100 wirelessly supplies power to the electronic device 200. When the electronic device 200 exists within the predetermined range, the electronic device 200 wirelessly receives power output from the power supply apparatus 100. When the electronic device 200 does not exist within the predetermined range, the electronic device 200 cannot receive power output from the power supply apparatus 100. Note that, the predetermined range is set as a range that enables the power supply apparatus 100 and the electronic device 200 to communicate to/from each other. Note that, the power supply apparatus 100 may be configured to wirelessly supply power to electronic devices.

The electronic device 200 may be an image capture apparatus such as a camera, or may be a reproducing device configured to reproduce data such as audio data or image data. The electronic device 200 may be a communication device such as a cellular phone or a smartphone. The electronic device 200 may be a battery pack including a battery 209. The electronic device 200 may be an automobile. The electronic device 200 may be a device configured to receive a television broadcast, a display configured to display image data, or a personal computer. The electronic device 200 may be a device configured to operate by using power supplied from the power supply apparatus 100 even when the battery 209 is not mounted.

Figure 2:
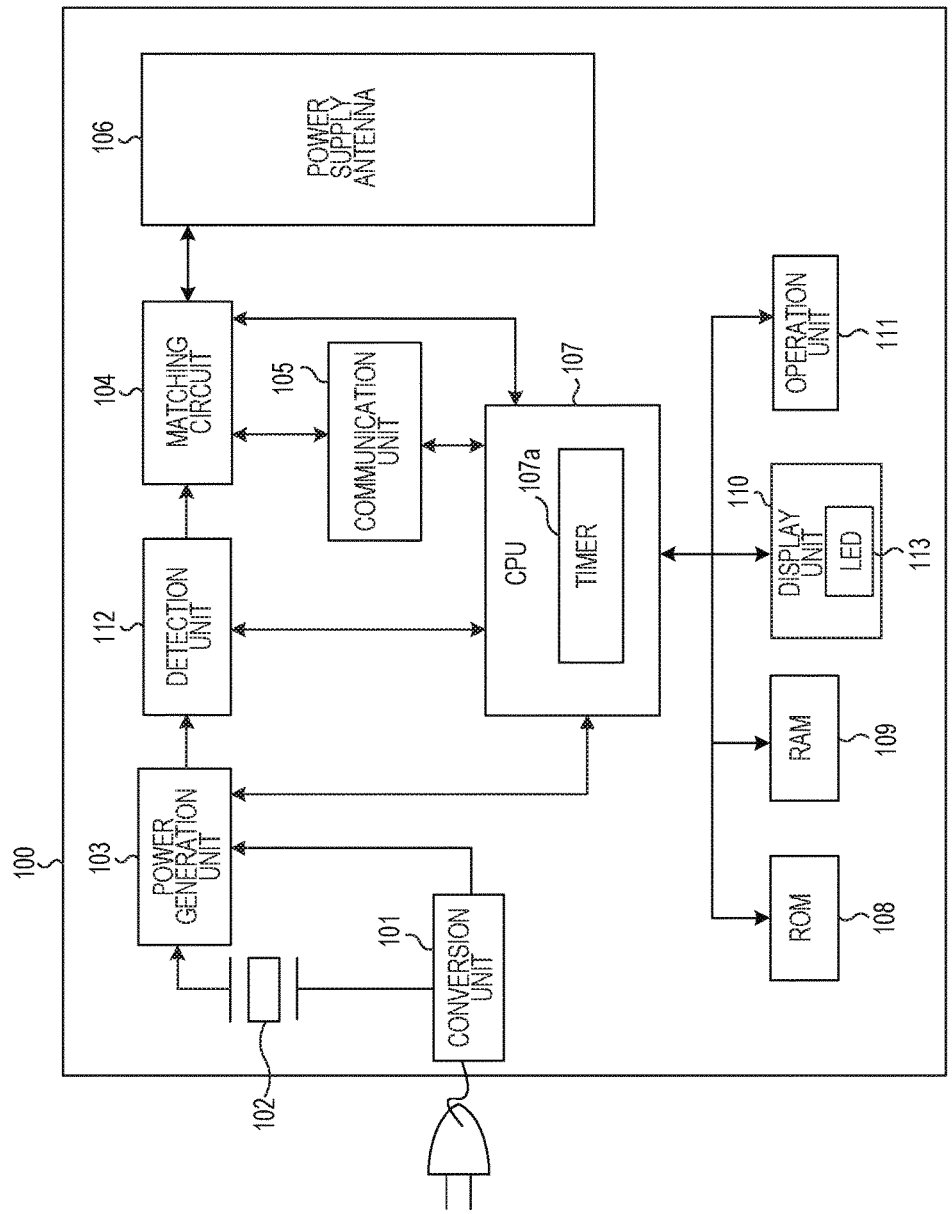
FIG. 2 is a block diagram for illustrating an example of a configuration of a power supply apparatus 100 in the first exemplary embodiment.

FIG. 2 is a block diagram for illustrating an example of a configuration of the power supply apparatus 100. As illustrated in FIG. 2, the power supply apparatus 100 includes a conversion unit 101, an oscillator 102, a power generation unit 103, a matching circuit 104, a communication unit 105, a power supply antenna 106, a central processing unit (CPU) 107, a ROM 108, a RAM 109, a display unit 110, an operation unit 111, and a detection unit 112.

When an AC power supply and the power supply apparatus 100 are connected to each other, the conversion unit 101 converts alternating-current power supplied from the AC power supply into direct-current power, and supplies the converted direct-current power to the power supply apparatus 100.

The oscillator 102 oscillates at a frequency to be used for controlling the power generation unit 103 to convert power supplied from the conversion unit 101 into target power set by the CPU 107. Note that, the oscillator 102 uses a quartz resonator or the like.

The power generation unit 103 generates power to be output to the outside through the power supply antenna 106 on the basis of power supplied from the conversion unit 101 and the frequency generated by the oscillation of the oscillator 102. Note that, the power generated by the power generation unit 103 is supplied to the matching circuit 104 through the detection unit 112.

The power generated by the power generation unit 103 includes first power and second power. The first power is power to be used by the communication unit 105 to communicate to/from the electronic device 200 through the power supply antenna 106. The second power is power to be used for causing the electronic device 200 to charge the battery 209 or conduct a predetermined process. For example, the first power is power lower than 1 W, and the second power is power equal to or higher than 2 W. Note that, the first power is assumed to be power lower than the second power. The first power may be power defined by a communication standard of the communication unit 105. The first power is not limited to power lower than 1 W. The second power is not limited to power equal to or higher than 2 W as long as the second power is power to be used for causing the electronic device 200 to charge the battery 209 or conduct a predetermined process.

The matching circuit 104 is a resonance circuit configured to produce resonance between the power supply antenna 106 and a power receiving antenna 201 of the electronic device 200. The matching circuit 104 includes a circuit configured to match impedance between the power generation unit 103 and the power supply antenna 106. The matching circuit 104 includes a coil and a capacitor.

When the power supply apparatus 100 outputs any one of the first power and the second power, the CPU 107 controls the matching circuit 104 so that a resonance frequency f of the power supply antenna 106 becomes a predetermined frequency in order to produce resonance between the power supply antenna 106 and the power receiving antenna 201. In this case, the CPU 107 controls a value of the coil included in the matching circuit 104 and a value of the capacitor included therein, to thereby change the resonance frequency f of the power supply antenna 106. Note that, the predetermined frequency is assumed to be a frequency of, for example, 13.56 MHz.

The communication unit 105 conducts a proximity wireless communication on the basis of, for example, NFC standard defined by Near Field Communication (NFC) Forum. When the first power is being output from the power supply antenna 106, the communication unit 105 can transmit and receive data for wireless power supply through the power supply antenna 106. However, it is assumed that the communication unit 105 does not communicate to/from the electronic device 200 through the power supply antenna 106 during a period during which the second power is being output from the power supply antenna 106. When the first power is being output from the power supply antenna 106, the communication unit 105 superposes data onto the first power, to thereby transmit the data to the electronic device 200. When transmitting the data to the power supply apparatus 100, the electronic device 200 modulates a load inside the electronic device 200, which causes a change in a current flowing through the power supply antenna 106. Therefore, the communication unit 105 detects the current flowing through the power supply antenna 106, and analyzes a detection result thereof, to thereby be able to receive the data from the electronic device 200.

Note that, data to be transmitted between the communication unit 105 and the electronic device 200 is data conforming to an NFC data exchange format (NDEF).

The power supply antenna 106 is an antenna for outputting the power generated by the power generation unit 103 to the outside. The power supply apparatus 100 supplies power to the electronic device 200 through the power supply antenna 106, and transmits data to the electronic device 200 through the power supply antenna 106. The power supply apparatus 100 also receives data from the electronic device 200 through the power supply antenna 106.

The CPU 107 executes a computer program stored in the ROM 108, to thereby control the power supply apparatus 100. The CPU 107 controls the power generation unit 103, to thereby control power to be supplied to the electronic device 200. The CPU 107 includes a timer 107a. The CPU 107 includes at least one microcomputer.

The ROM 108 is a memory configured to store a computer program for controlling the power supply apparatus 100 and information such as a parameter relating to the power supply apparatus 100.

The RAM 109 is a memory configured to store data acquired from the electronic device 200 by the communication unit 105.

The display unit 110 displays image data supplied from any one of the RAM 109 and the ROM 108. The display unit 110 also displays a warning to the user. The display unit 110 includes a light emitting diode (LED) 113. The CPU 107 causes the LED 113 to emit light on the basis of an operation conducted by the power supply apparatus 100.

The operation unit 111 provides a user interface for operating the power supply apparatus 100. The operation unit 111 includes a power button for the power supply apparatus 100 and a mode switching button for the power supply apparatus 100, and the respective buttons are formed of a switch, a touch panel, or the like. The CPU 107 controls the power supply apparatus 100 on the basis of an input signal input through the operation unit 111.

The detection unit 112 detects a voltage standing wave ratio (VSWR) in order to detect a state of resonance between the power supply apparatus 100 and the electronic device 200. The detection unit 112 supplies data indicating the detected VSWR to the CPU 107. The VSWR is a value indicating a relationship between a progressive wave of power output from the power supply antenna 106 and a reflected wave of power output from the power supply antenna 106. The CPU 107 can determine, by using the data indicating the VSWR supplied from the detection unit 112, whether or not an object has been placed in a vicinity of the power supply apparatus 100.

Figure 3:
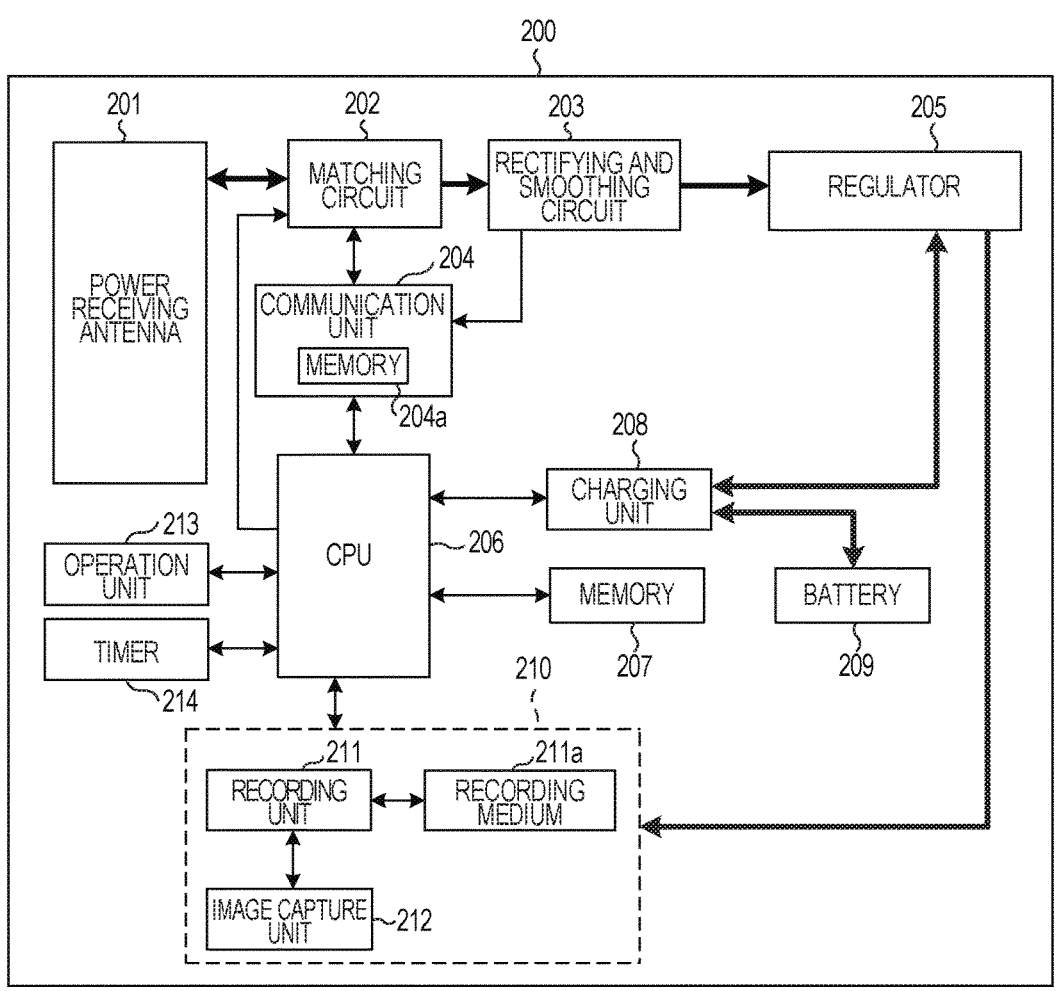
FIG. 3 is a block diagram for illustrating an example of a configuration of an electronic device 200 in the first exemplary embodiment.

Next, an example of a configuration of the electronic device 200 is described with reference to FIG. 3. The electronic device 200 includes the power receiving antenna 201, a matching circuit 202, a rectifying and smoothing circuit 203, a communication unit 204, a regulator 205, a central processing unit (CPU) 206, and a memory 207. The electronic device 200 further includes a charging unit 208, the battery 209, a system unit 210, an operation unit 213, and a timer 214.

The power receiving antenna 201 is an antenna for receiving power supplied from the power supply apparatus 100. The electronic device 200 receives from the power supply apparatus 100 through the power receiving antenna 201. The electronic device 200 also conducts a wireless communication to/from the power supply apparatus 100 through the power receiving antenna 201.

The matching circuit 202 is a resonance circuit configured to produce resonance between the power supply antenna 106 and the power receiving antenna 201 on the basis of the same frequency as the resonance frequency f of the power supply antenna 106. The matching circuit 202 includes a circuit configured to match impedance between the power receiving antenna 201 and the rectifying and smoothing circuit 203. The matching circuit 202 includes a coil and a capacitor. The CPU 206 controls a value of the coil included in the matching circuit 202 and a value of the capacitor included therein in order to set a resonance frequency of the power receiving antenna 201 to the same frequency as the resonance frequency f of the power supply antenna 106. The matching circuit 202 supplies power received by the power receiving antenna 201 to the rectifying and smoothing circuit 203.

The rectifying and smoothing circuit 203 removes data and noise from power supplied from the matching circuit 202 to generate direct-current power. The rectifying and smoothing circuit 203 supplies the generated direct-current power to the regulator 205. The rectifying and smoothing circuit 203 supplies the data removed from power received by the power receiving antenna 201 to the communication unit 204.

The communication unit 204 conducts a wireless communication to/from an external device such as the power supply apparatus 100 in accordance with the same network protocol as the communication unit 105. The communication unit 204 analyzes the data supplied from the rectifying and smoothing circuit 203, and supplies an analysis result of the data to the CPU 206. When the first power is being supplied from the power supply apparatus 100 to the electronic device 200, the communication unit 204 transmits response data to the received data to the power supply apparatus 100. In this case, the communication unit 204 causes the load included in the communication unit 204 to fluctuate in order to transmit the response data to the received data to the power supply apparatus 100. Note that, the communication unit 204 includes a memory 204a.

Figure 4:
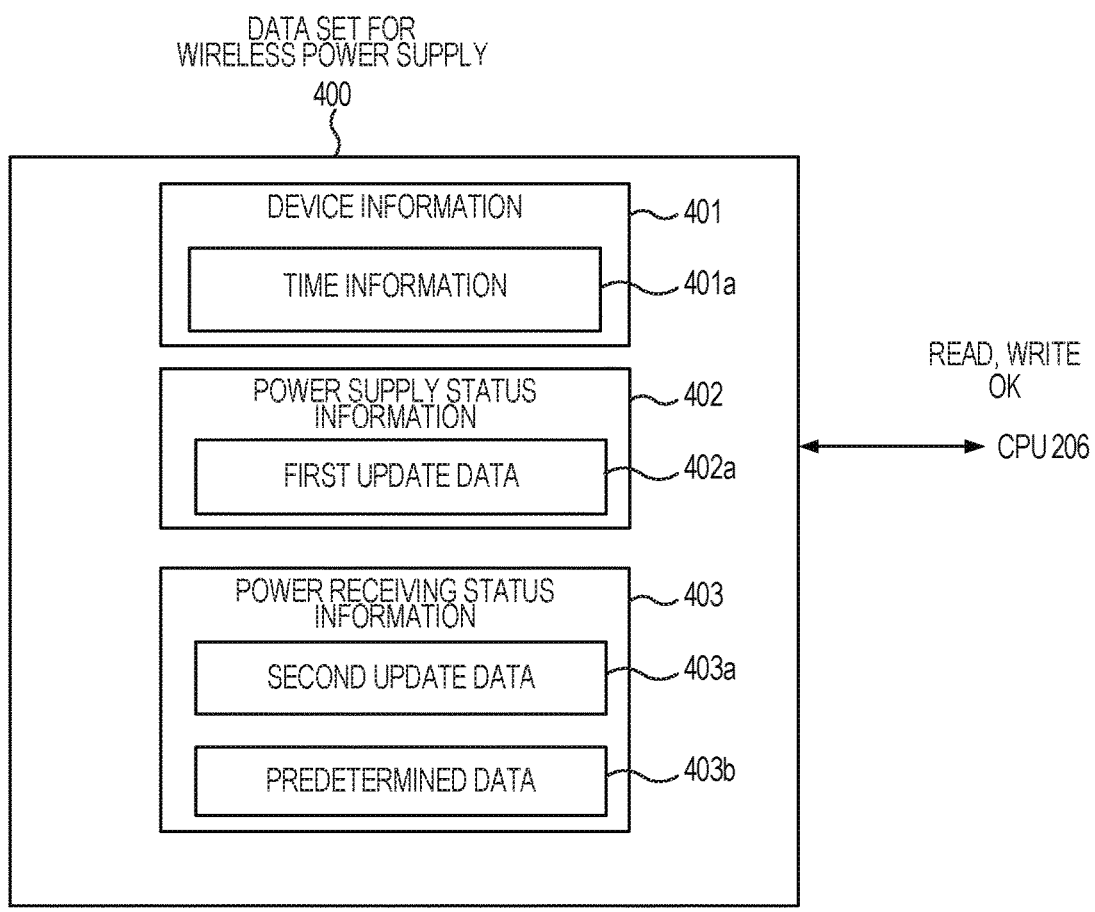
FIG. 4 is a diagram for illustrating an example of a data set for wireless power supply in the first exemplary embodiment.

The memory 204a stores a data set 400 for wireless power supply. The data set 400 for wireless power supply is illustrated in FIG. 4. The data set 400 for wireless power supply stores data to be transmitted between the power supply apparatus 100 and the electronic device 200. The data set 400 for wireless power supply stores device information 401, power supply status information 402, and power receiving status information 403. The device information 401, the power supply status information 402, and the power receiving status information 403 are data conforming to the NDEF.

The device information 401 includes information for identifying the electronic device 200, information for identifying a power supply method supported by the electronic device 200, and information indicating a power class of the electronic device 200. The device information 401 further includes information indicating the number of power supply methods supported by the electronic device 200. Therefore, when the electronic device 200 supports power supply methods, the device information 401 includes information indicating that the electronic device 200 supports power supply methods. Furthermore, the device information 401 includes information indicating a response time that is a time taken after the power receiving status information 403 is requested by the power supply apparatus 100 until the electronic device 200 transmits the power receiving status information 403 to the power supply apparatus 100.

In addition, the device information 401 includes time information 401a. The time information 401a indicates a time predicted to be required after an update of the power receiving status information 403 is started until the update of the power receiving status information 403 is completed. The time information 401a is used for controlling a timing at which the power supply apparatus 100 requests the electronic device 200 for the power receiving status information 403. Note that, the update of the power receiving status information 403 is described later.

The information indicating the power class of the electronic device 200 is information indicating a maximum value of power that can be received from the power supply apparatus 100 by the electronic device 200. For example, when the maximum value of power that can be received from the power supply apparatus 100 by the electronic device 200 is W, the information indicating the power class of the electronic device 200 becomes information indicating that the electronic device 200 supports a low power class. For example, when the maximum value of power that can be received from the power supply apparatus 100 by the electronic device 200 is 3 W, the information indicating the power class of the electronic device 200 becomes information indicating that the electronic device 200 supports a middle power class. For example, when the maximum value of power that can be received from the power supply apparatus 100 by the electronic device 200 is 6 W, the information indicating the power class of the electronic device 200 becomes information indicating that the electronic device 200 supports a high power class.

The device information 401*i* is information to be read from the data set 400 for wireless power supply within the memory 204*a* by the power supply apparatus 100. Note that, the device information 401 is fixed data stored in the memory 204*a* in advance.

The power supply status information 402 includes information indicating whether the power supply apparatus 100 is to start or stop wirelessly supplying power to the electronic device 200, information indicating whether or not an error has occurred in the power supply apparatus 100, and a first update data 402*a*. The power supply status information 402 may further include information indicating a period for outputting the second power. In addition, the power supply status information 402 includes information for identifying a power supply method supported by the power supply apparatus 100 and information indicating the number of power supply methods supported by the power supply apparatus 100. Furthermore, the power supply status information 402 includes information indicating a power class of the power supply apparatus 100.

The information indicating the power class of the power supply apparatus 100 is information indicating a maximum value of power that can be output by the power supply apparatus 100. For example, when the maximum value of power that can be output by the power supply apparatus 100 is 3 W, the information indicating the power class of the power supply apparatus 100 becomes information indicating that the power supply apparatus 100 supports a low power class. For example, when the maximum value of power that can be output by the power supply apparatus 100 is 10 W, the information indicating the power class of the power supply apparatus 100 becomes information indicating that the power supply apparatus 100 supports a middle power class. For example, when the maximum value of power that can be output by the power supply apparatus 100 is 20 W, the information indicating the power class of the power supply apparatus 100 becomes information indicating that the power supply apparatus 100 supports a high power class. Note that, the first update data 402*a* is described later.

The power supply status information 402 is information to be written to the data set 400 for wireless power supply within the memory 204*a* by the power supply apparatus 100. After the power supply status information 402 is stored into the memory 204*a*, the CPU 206 reads the power supply status information 402, to thereby be able to control the electronic device 200 on the basis of the power supply status information 402.

The power receiving status information 403 includes a second update data 403*a* and predetermined data 403*b*. The predetermined data 403*b* is data different from the second update data 403*a*. The predetermined data 403*b* includes information indicating whether or not an error has occurred in the electronic device 200 and information indicating whether or not the electronic device 200 is to request the power supply apparatus 100 for the wireless power supply. The predetermined data 403*b* may further include any one of information for requesting the power supply apparatus 100 to increase power to be supplied to the electronic device 200 and information for requesting the power supply apparatus 100 to decrease power to be supplied to the electronic device 200.

The predetermined data 403*b* may further include information for requesting the power supply apparatus 100 to maintain power to be supplied to the electronic device 200 as it is. The predetermined data 403*b* may further include information related to a remaining capacity of the battery 209 and information related to the charging of the battery 209. Note that, the second update data 403*a* is described later.

The power receiving status information 403 is written to the data set 400 for wireless power supply within the memory 204*a* by the CPU 206 to be periodically updated. The power receiving status information 403 is information to be read from the data set 400 for wireless power supply within the memory 204*a* by the power supply apparatus 100. Note that, the power receiving status information 403 is data periodically updated by the CPU 206 as information indicating a current status of the electronic device 200.

Note that, the communication unit 204 consumes less power than the CPU 206. The communication unit 204 can communicate to/from the communication unit 105 by using power received from the power supply apparatus 100 through the power receiving antenna 201 while the first power is being output from the power supply apparatus 100.

The regulator 205 controls power supplied from at least one of the rectifying and smoothing circuit 203 and the battery 209 so as to be supplied to the electronic device 200. The regulator 205 supplies power supplied from the power supply apparatus 100 through the rectifying and smoothing circuit 203 to the electronic device 200 on the basis of an instruction issued from the CPU 206. The regulator 205 supplies discharge power supplied from the battery 209 through the charging unit 208 to the electronic device 200 on the basis of an instruction issued from the CPU 206.

The CPU 206 controls the electronic device 200 on the basis of an analysis result of the data supplied from the communication unit 204. The CPU 206 also executes a computer program stored in the memory 207, to thereby control the electronic device 200. The CPU 206 includes at least one microcomputer.

The CPU 206 periodically updates the power receiving status information 403 on the basis of the information supplied from each of the components of the electronic device 200. Note that, the CPU 206 can update the power receiving status information 403 when sufficient power is being supplied from any one of the battery 209 and the rectifying and smoothing circuit 203 and when no error has occurred in the CPU 206. However, the CPU 206 cannot update the power receiving status information 403 when sufficient power is not being supplied from the battery 209 or the rectifying and smoothing circuit 203. Furthermore, the CPU 206 cannot update the power receiving status information 403 when sufficient power is being supplied from any one of the battery 209 and the rectifying and smoothing circuit 203 but when an error has occurred in the CPU 206.

The CPU 206 conducts the following process as a process for updating the power receiving status information 403. First, the CPU 206 reads the power supply status information 402 written to the data set 400 for wireless power supply. Subsequently, the CPU 206 updates the predetermined data 403*b* on the basis of the information notified from each of the components of the electronic device 200. After completing the update of the predetermined data 403*b*, the CPU 206 adds a specific value to the first update data 402a acquired from the power supply status information 402, to thereby acquire the second update data 403a. In addition, the CPU 206 writes the second update data 403a and the predetermined data 403b to the data set 400 for wireless power supply as the power receiving status information 403. After the above-mentioned process is conducted, the update of the power receiving status information 403 is completed. Note that, the CPU 206 does not add the specific value to the first update data 402a when the update of the predetermined data 403b has not been completed.

For example, a case where the first update data 402a is "N" with the specific value being "1" is described. After completing the update of the predetermined data 403b, the CPU 206 adds "1" to "N". After that, the CPU 206 writes the predetermined data 403b that has been updated and "N+1" (second update data 403a) to the data set 400 for wireless power supply as the power receiving status information 403. When the update of the predetermined data 403b has not been completed, the predetermined data 403b that has not been updated and "N" (second update data 403a) that is the same value as that of the first update data 402a are stored into the data set 400 for wireless power supply as the power receiving status information 403.

The memory 207 stores a computer program for controlling the electronic device 200. The memory 207 also stores information related to the electronic device 200 or the like.

The charging unit 208 uses power supplied from the regulator 205 to charge the battery 209. When the power is not supplied from the regulator 205, the charging unit 208 supplies discharge power supplied from the battery 209 to the regulator 205. The charging unit 208 periodically detects information related to the battery 209 and the information related to the charging of the battery 209, and notifies the CPU 206 of the detected information.

The battery 209 is a battery removably attachable to the electronic device 200. The battery 209 is a rechargeable secondary battery.

The system unit 210 includes a recording unit 211 and an image capture unit 212.

The recording unit 211 is capable of recording data such as image data or audio data supplied from the image capture unit 212 to a recording medium 211a. The recording unit 211 is capable of reading data such as image data or audio data from the recording medium 211a. Note that, the recording medium 211a may be a hard disk drive or a memory card, may be built into the electronic device 200, or may be an external recording medium removably attachable to the electronic device 200.

The image capture unit 212 includes an image capture element configured to generate image data from an optical image of a subject, an image processing circuit configured to conduct image processing for the image data generated by the image capture element, and a compression and expansion circuit configured to compress the image data and expand the compressed image data. The image capture unit 212 supplies the image data (including a still image and a moving image), which is obtained by capturing an image of the subject, to the recording unit 211. The recording unit 211 records the image data supplied from the image capture unit 212 on the recording medium 211a. The image capture unit 212 may further have a configuration required for capturing an image of the subject.

Note that, the system unit 2110 includes a unit to be supplied with power from the regulator 205 when the electronic device 200 is powered on. Therefore, the system unit 210 may further include a display unit configured to display the image data and a unit configured to transmit and receive email in addition to the recording unit 211, the recording medium 211a, and the image capture unit 212.

The operation unit 213 is a user interface for operating the electronic device 200. The operation unit 213 includes a power button for operating the electronic device 200 and a mode switching button capable of switching a mode of the electronic device 200, and the respective buttons are formed of a switch, a touch panel, or the like. When the operation unit 213 is operated by the user, the operation unit 213 supplies a signal corresponding to an operation conducted by the user to the CPU 206. Note that, the operation unit 213 may be configured to control the electronic device 200 on the basis of a remote control signal received from a remote controller.

The timer 214 measures a time relating to a process conducted by each of the components of the electronic device 200.

Note that, the power supply antenna 106 and the power receiving antenna 201 may each be a helical antenna, a loop antenna, or a planar antenna such as a meander line antenna.

In the first exemplary embodiment, the power supply apparatus 100 is configured to wirelessly supply power to the electronic device 200 on the basis of a magnetic field resonance system, but the first exemplary embodiment is not limited thereto.

For example, the power supply apparatus 100 may be configured to wirelessly supply power to the electronic device 200 on the basis of electric field coupling instead of the magnetic field resonance system. In this case, it is required to provide an electrode to the power supply apparatus 100 and to provide an electrode to the electronic device 200, and power is wirelessly supplied to the electrode of the electronic device 200 from the electrode of the power supply apparatus 100.

Furthermore, for example, the power supply apparatus 100 may be configured to wirelessly supply power to the electronic device 200 on the basis of electromagnetic induction instead of the magnetic field resonance system.

The power supply apparatus 100 is configured to wirelessly supply power to the electronic device 200. However, in the first exemplary embodiment and another exemplary embodiment, "wireless" may be paraphrased as "noncontact" or "contactless".

Next, a power supply process conducted by the CPU 107 in the first exemplary embodiment is described with reference to a flowchart illustrated in FIG. 5. The power supply process can be realized by the CPU 107 executing the computer program stored in the ROM 108.

When the power supply apparatus 100 is powered on, in step S501, the CPU 107 controls at least one of the oscillator 102, the power generation unit 103, and the matching circuit 104 so as to output the first power through the power supply antenna 106. In this case, the power supply process advances to step S502.

In step S502, the communication unit 105 conducts authentication for conducting a wireless communication to/from the communication unit 204. In this case, the power supply process advances to step S503.

In step S503, the communication unit 105 determines whether or not the authentication for conducting the wireless communication to/from the communication unit 204 has been completed. When the authentication for conducting the wireless communication to/from the communication unit 204 has been completed (YES in step S503), the power supply process advances to step S505. When the authentication for conducting the wireless communication to/from the communication unit 204 has not been completed (NO in step S503), the power supply process advances to step S504. When the authentication for conducting the wireless communication to/from the communication unit 204 has been completed (YES in step 3503), the communication unit 105 establishes a communication link with respect to the communication unit 204. In addition, when the authentication for conducting the wireless communication to/from the communication unit 204 has been completed (YES in step S503), the communication unit 105 notifies the CPU 107 that a communication link with respect to the communication unit 204 has been established. While the communication link between the communication unit 105 and the communication unit 204 is maintained, the communication unit 105 can receive the data conforming to the NDEF from the communication unit 204, and can transmit the data conforming to the NDEF to the communication unit 204.

When the authentication for conducting the wireless communication to/from the communication unit 204 has not been completed (NO in step S503), the communication unit 105 cannot establish a communication link with respect to the communication unit 204. When the communication link between the communication unit 105 and the communication unit 204 has not been established, the communication unit 105 cannot receive the data conforming to the NDEF from the communication unit 204, or cannot transmit the data conforming to the NDEF to the communication unit 204.

In step S504, the CPU 107 controls at least one of the oscillator 102, the power generation unit 103, and the matching circuit 104 so as to stop outputting the power through the power supply antenna 106. In this case, the power supply process is brought to an end. Note that, the CPU 107 may be configured to again conduct the process of step S501 after a fixed time has elapsed since the process of step S504 is conducted.

In step S505, the CPU 107 controls the communication unit 105 so as to transmit a first command for acquiring the device information 401 to the electronic device 200. In this case, the power supply process advances to step S506.

When the first command is received, the communication unit 204 transmits to the power supply apparatus 100 the device information 401 read from the data set 400 for wireless power supply as response data to the first command. Then, in step S506, the CPU 107 determines whether or not the communication unit 105 has received the device information 401 as the response data to the first command. When the device information 401 is received, the communication unit 105 records the received device information 401 into the RAM 109, and then notifies the CPU 107 that the reading of the device information 401 has been completed.

Therefore, when the CPU 107 is notified by the communication unit 105 that the reading of the device information 401 has been completed, the CPU 107 determines that the communication unit 105 has received the device information 401 (YES in step S506). In this case (YES in step S506), the power supply process advances to step S507. When the device information 401 is not received, the communication unit 105 does not notify the CPU 107 that the reading of the device information 401 has been completed. Therefore, when the CPU 107 is not notified by the communication unit 105 that the reading of the device information 401 has been completed, the CPU 107 determines that the communication unit 105 has not received the device information 401 (NO in step S506). In this case (NO in step S506), the power supply process advances to step S504.

In step S507, the CPU 107 determines whether or not the electronic device 200 supports the wireless power supply.

The CPU 107 uses the device information 401 recorded in the RAM 109 to determine whether or not the electronic device 200 supports the wireless power supply. When the electronic device 200 supports the wireless power supply (YES in step S507), the power supply process advances to step S508. When the electronic device 200 does not support the wireless power supply (NO in step S507), the power supply process advances to step S504.

In step S508, the CPU 107 acquires the time information 401a from the device information 401 recorded in the RAM 109, and determines the time indicated by the time information 401a, in addition, the CPU 107 sets the time indicated by the time information 401a as a threshold value for the time to be measured by the timer 107a. The threshold value for the time to be measured by the timer 107a is hereinafter referred to as "predetermined time" In this case, the power supply process advances to step S509.

In step S509, the CPU 107 generates the power supply status information 402, and controls the communication unit 105 so as to transmit a second command including the generated power supply status information 402 to the electronic device 200. In step S509, the power supply status information 402 generated by the CPU 1.07 includes information indicating that the power supply apparatus 100 is to start wirelessly supplying power to the electronic device 200, information indicating that no error has occurred in the power supply apparatus 100, and the first update data 402a. The first update data 402a is used for determining whether or not the power receiving status information 403 has been updated by the CPU 206.

Note that, the first update data 402a may be a value generated at random, or may be a value determined in advance. The CPU 107 reads the first update data 402a stored in the RAM 109 to generate the power supply status information 402. The following description is made on the assumption that the first update data 402a transmitted to the electronic device 200 in step S509 is "N" Note that, "N" is assumed to be a natural number. The second command is a command for writing the power supply status information 402 to the data set 400 for wireless power supply. When the second command is transmitted by the communication unit 105, the power supply process advances to step S510.

When the communication unit 204 receives the second command, the communication unit 204 writes the power supply status information 402 included in the second command to the data set 400 for wireless power supply. After the power supply status information 402 is written to the data set 400 for wireless power supply, the communication unit 204 transmits data indicating that the writing of the power supply status information 402 to the data set 400 for wireless power supply has been completed to the power supply apparatus 100 as response data to the second command.

Then, in step S510, the CPU 107 determines whether or not the communication unit 105 has received the response data to the second command. When the communication unit 105 receives the response data to the second command, the communication unit 105 notifies the CPU 107 that the response data to the second command has been received. Therefore, when the CPU 107 is notified by the communication unit 105 that the response data to the second command has been received, the CPU 107 determines that the communication unit 105 has received the response data to the second command (YES in step S510). In this case (YES in step S510), the power supply process advances to step S511. When it is determined that the communication unit 105 has received the response data to the second command (YES in step S510), the CPU 107 controls the timer 107a so as to measure a time that has elapsed since the CPU 107 is notified by the communication unit 105 that the response data to the second command has been received.

When the communication unit 105 has not received the response data to the second command, the communication unit 105 does not notify the CPU 107 that the response data to the second command has been received before the response data to the second command is received. Therefore, when the CPU 107 is not notified by the communication unit 105 that the response data to the second command has been received, the CPU 107 determines that the communication unit 105 has not received the response data to the second command (NO in step S510). In this case (NO in step S510), the power supply process advances to step S504.

When it is determined that the communication unit 105 has received the response data to the second command (YES in step S510), the power supply apparatus 100 is required to acquire correct power receiving status information 403 as information indicating the status of the electronic device 200 in order to control power supply to the electronic device 200. The power supply apparatus 100 sometimes fails to supply desired power to the electronic device 200 when incorrect power receiving status information 403 is used as the information indicating the status of the electronic device 200 to control the power supply to the electronic device 200. In order to prevent such a situation, the power supply apparatus 100 conducts the following process from step S511 to step S514.

After the response data to the second command is transmitted to the power supply apparatus 100 by the communication unit 204, the electronic device 200 starts updating the power receiving status information 403. Therefore, when the power supply apparatus 100 requests the electronic device 200 for the power receiving status information 403 before the update of the power receiving status information 403 is completed, the power supply apparatus 100 sometimes acquires the power receiving status information 403 that has not been updated from the electronic device 200. In this case, even when the power supply apparatus 100 uses the power receiving status information 403 acquired from the electronic device 200 to control the power supply to the electronic device 200, the power supply apparatus 100 cannot supply the desired power to the electronic device 200.

Therefore, the power supply apparatus 100 conducts the process of step S511 and step S512 in order to request the electronic device 200 for the power receiving status information 403 after the update of the power receiving status information 403 has been completed.

In step S511, the CPU 107 determines whether or not the predetermined time has elapsed since the CPU 107 is notified by the communication unit 105 that the response data to the second command has been received. The predetermined time in step S511 is the time set by the CPU 107 in step S508. When the time measured by the timer 107a is equal to or longer than the predetermined time, the CPU 107 determines that the predetermined time has elapsed since the CPU 107 is notified by the communication unit 105 that the response data to the second command has been received (YES in step S511). In this case (YES in step S511), the power supply process advances to step S512. In this case (YES in step S511), the CPU 107 determines that the update of the power receiving status information 403 has been completed by the electronic device 200.

When the time measured by the timer 107a is not equal to or longer than the predetermined time, the CPU 107 determines that the predetermined time has not elapsed since the CPU 107 is notified by the communication unit 105 that the response data to the second command has been received (NO in step S511). In this case (NO in step S511), the CPU 107 determines that the update of the power receiving status information 403 has not been completed by the electronic device 200. In this case (NO in step S511), the CPU 107 repeatedly conducts the process of step S511 until the time measured by the timer 107a becomes equal to or longer than the predetermined time.

After the predetermined time has elapsed (YES in step S511), in step S512, the CPU 107 controls the communication unit 105 so as to transmit a third command for requesting the power receiving status information 403 to the electronic device 200. After that, the power supply process advances to step S513. Note that, the CPU 107 controls the communication unit 105 so as not to transmit the third command to the electronic device 200 before it is determined that the predetermined time has elapsed (YES in step S511).

When the third command is received from the power supply apparatus 100, the communication unit 204 transmits to the power supply apparatus 100 the power receiving status information 403 within the data set 400 for wireless power supply as response data to the third command within the response time.

Therefore, in step S513, the CPU 107 determines whether or not the communication unit 105 has received the power receiving status information 403 as the response data to the third command after the third command is transmitted before the response time has elapsed. The response time in step S513 is acquired from the information included in the device information 401. When the communication unit 105 receives the power receiving status information 403 before the response time has elapsed, the communication unit 105 records the received power receiving status information 403 into the RAM 109, and then notifies the CPU 107 that the reading of the power receiving status information 403 has been completed.

Therefore, when the CPU 107 is notified by the communication unit 105 that the reading of the power receiving status information 403 has been completed, the CPU 107 determines that the communication unit 105 has received the power receiving status information 403 (YES in step S513). In this case (YES in step S513), the power supply process advances to step S514. When the power receiving status information 403 has not been received even after the response time has elapsed, the communication unit 105 does not notify the CPU 107 that the reading of the power receiving status information 403 has been completed. Therefore, when the CPU 107 has not been notified by the communication unit 105 that the reading of the power receiving status information 403 has been completed, the CPU 107 determines that the communication unit 105 has not received the power receiving status information 403 (NO in step S513). In this case (NO in step S513), the power supply process advances to step 3504.

When the update of the power receiving status information 403 has been completed by the CPU 206, the communication unit 204 transmits the power receiving status information 403 that has been updated to the power supply apparatus 100 as the response data to the third command. However, when the power receiving status information 403 has not been updated by the CPU 206, the communication unit 204 transmits the power receiving status information 403 that has not been updated to the power supply apparatus 100 as the response data to the third command. When the update of the power receiving status information 403 has not been completed by the CPU 206, the communication unit 20-transmits the power receiving status information 403 that has not been updated to the power supply apparatus 100 as the response data to the third command.

Then, the power supply apparatus 100 conducts the process of step S514 in order to determine whether or not the power receiving status information 403 acquired from the electronic device 200 is correct information as the information indicating the status of the electronic device 200.

In step S514, the CPU 107 determines whether or not the power receiving status information 403 has been updated by the electronic device 200.

For example, the CPU 107 analyzes the power receiving status information 403 within the RAM 109, and acquires the second update data 403a included in the power receiving status information 403. After that, the CPU 107 uses the second update data 403a to determine whether or not the power receiving status information 403 has been updated by the electronic device 200. In this case, the CPU 107 determines whether or not the first update data 402a included in the power supply status information 402 transmitted in step S509 and the second update data 403a included in the power receiving status information 403 received in step S513 match each other.

When the first update data 402a and the second update data 403a match each other, the CPU 107 determines that the power receiving status information 403 has not been updated by the electronic device 200. When the first update data 402a and the second update data 403a do not match each other, the CPU 107 determines that the power receiving status information 403 has been updated by the electronic device 200. For example, when the first update data 402a is "N" with the second update data 403a being "N", the CPU 107 determines that the power receiving status information 403 has not been updated by the electronic device 200. When the first update data 402a is "N" with the second update data 403a being "N+1", the CPU 107 determines that the power receiving status information 403 has been updated by the electronic device 200.

When the power receiving status information 403 has been updated by the electronic device 200 (YES in step S514), the CPU 107 determines that the power receiving status information 403 acquired in step S513 is correct as the information indicating the status of the electronic device 200. In this case (YES in step S514), the power supply process advances to step S515.

When the power receiving status information 403 has not been updated by the electronic device 200 (NO in step S514), the CPU 107 determines that the power receiving status information 403 acquired in step S513 is not correct as the information indicating the status of the electronic device 200. In this case (NO in step S514), the power supply process advances to step S504. In this case (NO in step S514), the CPU 107 inhibits the power receiving status information 403 acquired in step S513 from being used for controlling power to be wirelessly supply to the electronic device 200.

When the power receiving status information 403 has been updated by the electronic device 200 (YES in step S514), the CPU 107 erases the first update data 402a stored in the RAM 109. In addition, the CPU 107 stores the second update data 403a included in the power receiving status information 403 into the RAM 109 as the first update data 402a. In this case, when the second update data 403a is "N+1", the CPU 107 stores "N+1" into the RAM 109 as the first update data 402a.

In step S515, the CPU 107 uses the power receiving status information 403 acquired from the electronic device 200 to control whether or not to supply power to the electronic device 200. For example, when the power receiving status information 403 includes information indicating that the electronic device 200 is not to request the power supply apparatus 100 to supply power, the CPU 107 determines not to supply power to the electronic device 200. When the power receiving status information 403 includes information indicating that the battery 209 is fully charged, the CPU 107 determines not to supply power to the electronic device 200.

When the power receiving status information 403 includes information indicating that an error has occurred in the electronic device 200, the CPU 107 determines not to supply power to the electronic device 200. When the power receiving status information 403 includes information indicating that the electronic device 200 is to request the power supply apparatus 100 to supply power, the CPU 1.07 determines to supply power to the electronic device 200. When the power receiving status information 403 includes information indicating that the battery 209 is not fully charged, the CPU 107 determines to supply power to the electronic device 200. When the power receiving status information 403 includes information indicating that no error has occurred in the electronic device 200, the CPU 107 determines to supply power to the electronic device 200.

When it is determined to supply power to the electronic device 200 (YES in step S515), the power supply process advances to step S517. When it is determined not to supply power to the electronic device 200 (NO in step S515), the power supply process advances to step S516.

In step S516, the CPU 107 generates the power supply status information 402, and controls the communication unit 105 so as to transmit the generated power supply status information 402 to the electronic device 200. Note that, the power supply status information 402 generated by the CPU 107 in step S516 includes information indicating that the power supply apparatus 100 is to stop wirelessly supplying power to the electronic device 200. When an error has occurred in the power supply apparatus 100, the power supply status information 402 generated by the CPU 107 in step S516 further includes information indicating that an error has occurred in the power supply apparatus 100.

When the power supply status information 402 is transmitted by the communication unit 105, the power supply process advances to step S504. When the power supply status information 402 is transmitted by the communication unit 105, the CPU 107 notifies that the power supply from the power supply apparatus 100 to the electronic device 200 has been completed by causing the LED 113 to emit light.

In step S517, the CPU 107 controls at least one of the oscillator 102, the power generation unit 103, and the matching circuit 104 so as to output the second power through the power supply antenna 106. In step S517, a magnitude of the second power output through the power supply antenna 106 is set by the CPU 107 through use of at least one of the device information 401 and the power receiving status information 403.

After a power supply period has elapsed since the second power is output, the CPU 107 controls at least one of the oscillator 102, the power generation unit 103, and the matching circuit 104 so as to switch the power output through the power supply antenna 106 from the second power to the first power. After that, the power supply process returns to step S509. Note that, the power supply period is a period for outputting the power, which is used to cause the electronic device 200 to charge the battery 209, to the electronic device 200.

Note that, the power supply period may be set by the CPU 107, or may be determined in advance. Note that, the CPU 107 may be configured to set a power supply time by using at least one of the device information 401 and the power receiving status information 403. When an output of the second power is started in step S517, the CPU 107 notifies that the power supply apparatus 100 is supplying power to the electronic device 200 by causing the LED 113 to emit light. Furthermore, when the output of the second power is started, the CPU 107 may notify that the power supply apparatus 100 is supplying power to the electronic device 200 by controlling the display unit 110.

When step S509 is conducted again after step S517 is conducted, the CPU 107 generates the power supply status information 402 including the first update data 402a stored in the PAM 109 in the case of "YES" in step S514. After that, the CPU 107 controls the communication unit 105 so as to transmit the generated power supply status information 402 to the electronic device 200.

Note that, when the communication link between the communication unit 105 and the communication unit 204 is disconnected, the CPU 107 resets the first update data 402a stored in the RAM 109. After that, when the communication link between the communication unit 105 and the communication unit 204 is established and when the power receiving status information 403 is to be acquired, the CPU 107 again sets the first update data 402a, and transmits the power supply status information 402 including the first update data 402a to the electronic device 200.

Furthermore, the CPU 107 may reset the first update data 402a stored in the RAM 109 when the communication link between the communication unit 105 and the communication unit 204 is established again after the communication link between the communication unit 105 and the communication unit 204 is disconnected. In this case, when the power receiving status information 403 is to be acquired, the CPU 107 again sets the first update data 402a, and transmits the power supply status information 402 including the first update data 402a to the electronic device 200.

Figure 5:
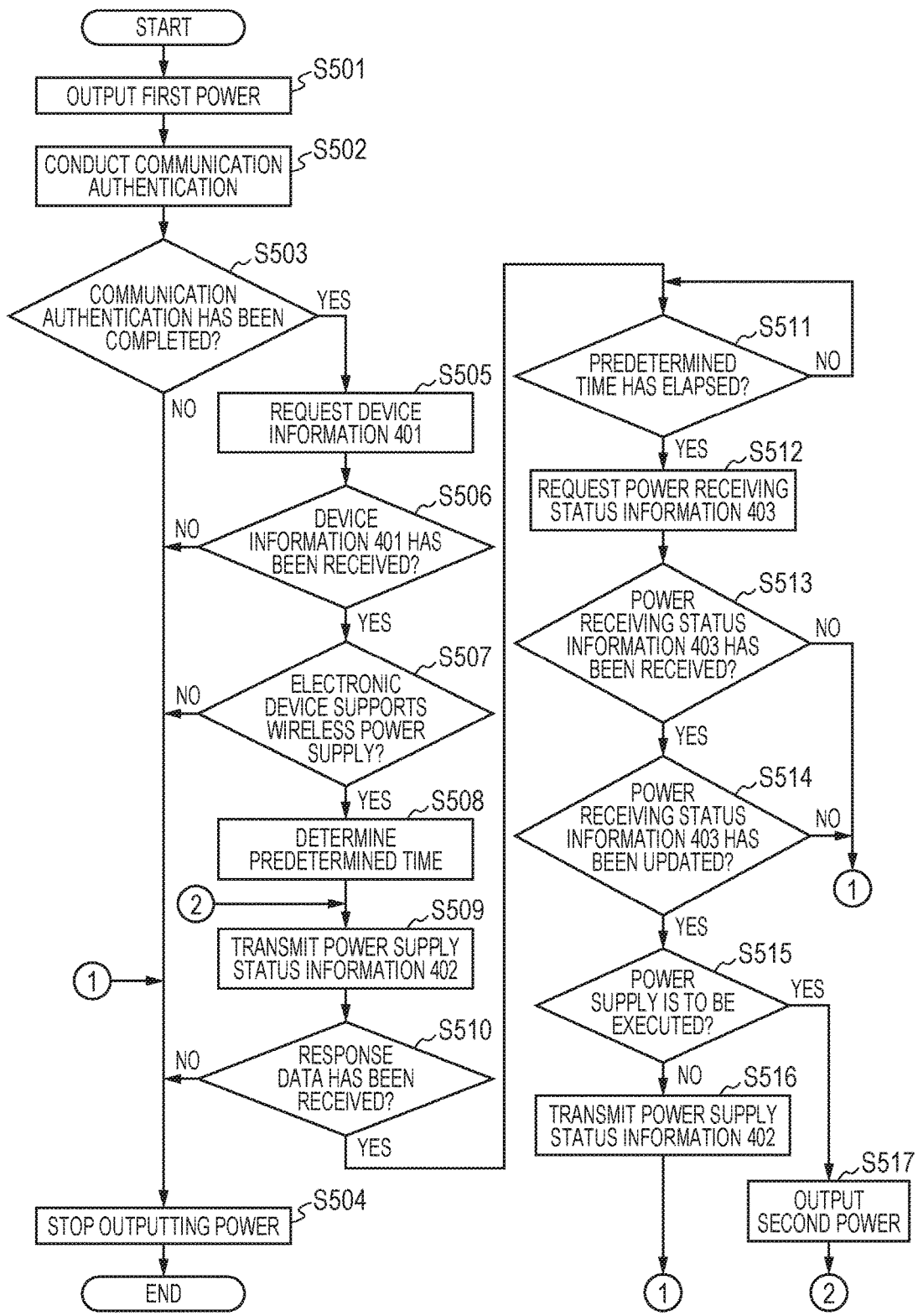
FIG. 5 is a flowchart for illustrating an example of a power supply process in the first exemplary embodiment.

In the power supply process illustrated in FIG. 5, the CPU 107 is configured to conduct the process of step S509 again after the process of step S517 is conducted under a state in which the communication link between the communication unit 105 and the communication unit 204 is maintained. However, the first exemplary embodiment is not limited thereto. For example, the CPU 107 may be configured to control, after the process of step S517 is conducted, the communication unit 105 so as to temporarily disconnect the communication link between the communication unit 105 and the communication unit 204 and to conduct the process of step S501 again.

A communication process conducted by the electronic device 200 is described with reference to a flowchart illustrated in FIG. 6.

When the power receiving antenna 201 receives power from the power supply apparatus 100 and when power received by the power receiving antenna 201 is supplied to the communication unit 204, in step S601, the communication unit 204 conducts authentication for conducting a wireless communication to/from the communication unit 105. After that, the communication process advances to step S602.

In step S602, the communication unit 204 determines whether or not the authentication for conducting the wireless communication to/from the communication unit 105 has been completed. When the authentication for conducting the wireless communication to/from the communication unit 105 has been completed (YES in step S602), the communication process advances to step S603. When the authentication for conducting the wireless communication to/from the communication unit 105 has not been completed (NO in step S602), the communication process is brought to an end. When the authentication for conducting the wireless communication to/from the communication unit 105 has been completed (YES in step S602), the communication unit 204 establishes a communication link with respect to the communication unit 105.

While the communication link between the communication unit 105 and the communication unit 204 is maintained, the communication unit 204 can receive the data conforming to the NDEF from the communication unit 105, and can transmit the data conforming to the NDEF to the communication unit 105. When the authentication for conducting the wireless communication to/from the communication unit 105 has not been completed (NO in step S602), the communication unit 204 cannot establish the communication link with respect to the communication unit 105. When the communication link between the communication unit 105 and the communication unit 204 has not been established, the communication unit 204 cannot receive the data conforming to the NDEF from the communication unit 105, or cannot transmit the data conforming to the NDEF to the communication unit 105.

In step S603, the communication unit 204 determines whether or not data has been received from the power supply apparatus 100. When the communication unit 204 receives data from the power supply apparatus 100 (YES in step S603), the communication process advances to step S604. When the communication unit 204 has not received data from the power supply apparatus 100 (NO in step S603), the communication unit 204 repeatedly conducts the process of step S603 until the communication unit 204 receives data from the power supply apparatus 100.

In step S604, the communication unit 204 determines whether or not the device information 401 has been requested by the power supply apparatus 100. When the communication unit 204 receives the first command, the communication unit 204 determines that the device information 401 has been requested by the power supply apparatus 100 (YES in step S604), and the communication process advances to step S605. When the communication unit 204 has not received the first command, the communication unit 204 determines that the device information 401 has not been requested (NO in step S604), and the communication process advances to step S607.

In step S605, the communication unit 204 transmits to the power supply apparatus 100 the device information 401 read from the data set 400 for wireless power supply as the response data to the first command. In this case, the communication process advances to step S606. After the device information 401 is transmitted to the power supply apparatus 100, the communication unit 204 notifies the CPU 206 that the reading of the device information 401 has been completed.

In step S606, the communication unit 201 determines whether or not the communication link with respect to the communication unit 105 has been disconnected. When the communication unit 204 determines that the communication link with respect to the communication unit 105 has not been disconnected (NO in step S606), the communication process returns to step S603. When the communication unit 204 determines that the communication link with respect to the communication unit 105 has been disconnected (YES in step S606), the communication process returns to step S601.

In step S607, the communication unit 204 determines whether or not the power supply status information 402 has been received from the power supply apparatus 100. When the communication unit 204 receives the second command, the communication unit 204 determines that the power supply status information 402 has been received (YES in step S607), and the communication process advances to step S608. When the communication unit 204 has not received the second command, the communication unit 204 determines that the power supply status information 402 has not been received (NO in step S607), and the communication process advances to step S613.

In step S608, the communication unit 204 writes the power supply status information 402 included in the second command to the data set 400 for wireless power supply. After the power supply status information 402 included in the second command is written to the data set 400 for wireless power supply, the communication process advances to step S609.

In step S609, the communication unit 204 transmits the data indicating that the writing of the power supply status information 402 to the data set 400 for wireless power supply has been completed to the power supply apparatus 100 as the response data to the second command. After that, the communication process advances to step S610.

In step S610, the communication unit 204 notifies the CPU 206 that the writing of the power supply status information 402 to the data set 400 for wireless power supply has been completed. After that, the communication process advances to step S611.

In step S611, the CPU 206 determines whether or not the power receiving status information 403 can be updated. When the CPU 206 can update the power receiving status information 403 (YES in step S611), the communication process advances to step S612. When the CPU 206 cannot update the power receiving status information 403 (NO in step S611), the communication process advances to step S606.

In step S612, the CPU 206 starts updating the power receiving status information 403 on the basis of a notification received from the communication unit 204 in step S610. First, the CPU 206 reads the power supply status information 402 written to the data set 400 for wireless power supply in step S608. Subsequently, the CPU 206 updates the predetermined data 403b on the basis of the information supplied from each of the components of the electronic device 200. In addition, the CPU 206 adds the specific value to the first update data 402a, to thereby acquire the second update data 403a. After that, the CPU 206 writes the updated predetermined data 403b and the second update data 403a to the data set 400 for wireless power supply as the power receiving status information 403. With this operation, the update of the power receiving status information 403 is completed. After the update of the power receiving status information 403 has been completed, the communication process advances to step S606.

Note that, the time indicated by the time information 401a included in the device information 401 includes at least a time required by the CPU 206 to execute the process of step S612. In addition, the time indicated by the time information 401a included in the device information 401 may include a time required by the communication unit 204 to conduct the process of step S610 and a time required by the CPU 206 to execute the process of step S611. In addition, the time indicated by the time information 401a included in the device information 401 may include a time serving as a margin.

In step S613, the communication unit 204 determines whether or not the power receiving status information 403 has been requested by the power supply apparatus 100. When the communication unit 204 receives the third command, the communication unit 204 determines that the power receiving status information 403 has been requested by the power supply apparatus 100 (YES in step S613), and the communication process advances to step S614. When the communication unit 204 has not received the third command, the communication unit 204 determines that the power receiving status information 403 has not been requested (NO in step S613), and the communication process advances to step S615.

In step S614, the communication unit 204 transmits to the power supply apparatus 100 the power receiving status information 403 read from the data set 400 for wireless power supply as the response data to the third command. In this case, the communication process advances to step S606. After the power receiving status information 403 is transmitted to the power supply apparatus 100, the communication unit 204 notifies the CPU 206 that the reading of the power receiving status information 403 from the data set 400 for wireless power supply has been completed.

In step S615, the communication unit 204 transmits the response data to the data received from the power supply apparatus 100, and outputs a notification for causing the CPU 206 to conduct a process corresponding to the data received from the power supply apparatus 100 to the CPU 206. After that, the CPU 206 controls the electronic device 200 on the basis of the notification received from the communication unit 204. In this case, the communication process advances to step S606.

In step S612, the CPU 206 is configured to acquire the second update data 403a by adding the specific value to the first update data 402a after the predetermined data 403b is updated. However, the first exemplary embodiment is not limited thereto. For example, in step S612, the CPU 206 may acquire the second update data 403a by subtracting a specific value from the first update data 402a after the predetermined data 403b is updated.

Figure 6:
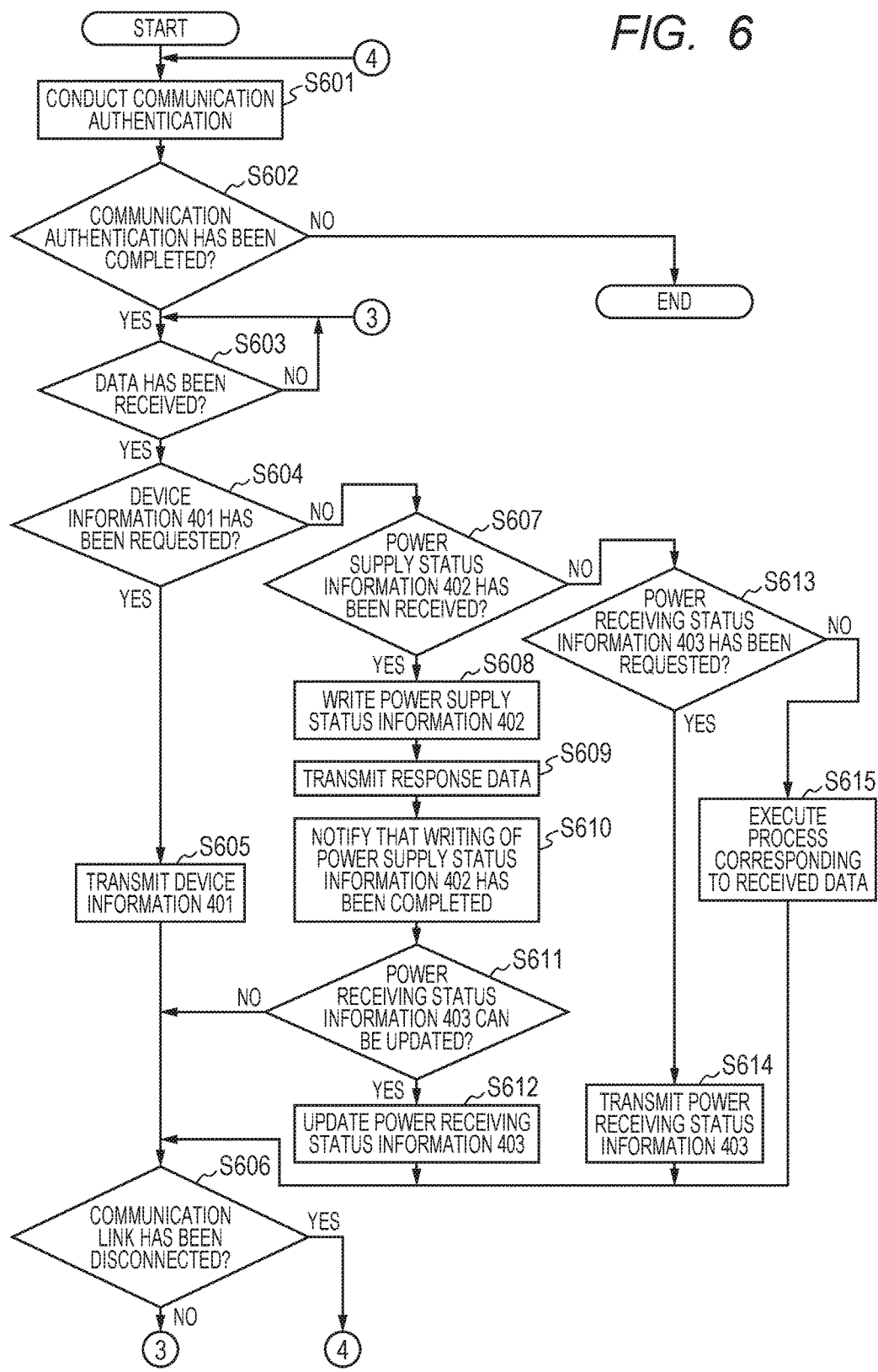
FIG. 6 is a flowchart for illustrating an example of a communication process in the first exemplary embodiment.

Next, an operation of the power supply apparatus 100 conducted when the power supply process illustrated in FIG. 5 is conducted by the power supply apparatus 100 and an operation of the electronic device 200 conducted when the communication process illustrated in FIG. 6 is conducted by the electronic device 200 are described with reference to a sequence chart illustrated in FIGS. 7A and 7B.

When the power supply apparatus 100 is powered on, in step S701, the CPU 107 conducts a process for outputting the first power through the power supply antenna 106. The process of step S701 corresponds to the process of step S501 of FIG. 5.

After the process of step S701 is conducted, in step S702, the first power is output from the power supply apparatus 100 to the electronic device 200. After the process of step S702 is conducted, in step S703, a process for establishing the communication link between the communication unit 105 and the communication unit 204 is conducted by the communication unit 105 and the communication unit 204. After the process of step S703 is conducted, in step S704, the communication unit 105 notifies the CPU 107 that the communication link between the communication unit 105 and the communication unit 201 has been established.

After the process of step S704 is conducted, in step S705, the CPU 107 controls the communication unit 105 so as to transmit the first command in order to request the electronic device 200 for the device information 401. The process of step S705 corresponds to the process of step S505 illustrated in FIG. 5. After the process of step S705 is conducted, in step S706, the first command is transmitted to the electronic device 200.

When the communication unit 204 receives the first command, in step S707, the device information 401 read from the data set 400 for wireless power supply is transmitted to the power supply apparatus 100 by the communication unit 204 as the response data to the first command. After the process of step S707 is conducted, in step S708, the communication unit 204 notifies the CPU 206 that the reading of the device information 401 has been completed.

After the process of step S707 is conducted, when the communication unit 105 receives the device information 401 in step S709, the communication unit 105 notifies the CPU 107 that the reading of the device information 401 has been completed. After the process of step S709 is conducted, in step S710, the CPU 107 determines that the electronic device 200 supports the wireless power supply (when YES in step S507). After the process of step S710 is conducted, in step S711, the CPU 107 determines the time indicated by the time information 401a, and sets the time indicated by the time information 401a as the predetermined time. The process of step S711 corresponds to the process of step S508 illustrated in FIG. 5.

After the process of step S711 is conducted, in step S712, the CPU 107 controls the communication unit 105 so as to transmit the second command in order to transmit the power supply status information 402 to the electronic device 200. The process of step 712 corresponds to the process of step S509 illustrated in FIG. 5. After the process of step S712 is conducted, in step S713, the second command is transmitted to the electronic device 200.

When the communication unit 204 receives the second command, in step S714, the data indicating that the power supply status information 402 has been written to the data set 400 for wireless power supply is transmitted to the power supply apparatus 100 by the communication unit 204 as the response data to the second command. The process of step S714 corresponds to the process of step S609 illustrated in FIG. 6.

After the process of step S714 is conducted, in step S715, the communication unit 204 notifies the CPU 206 that the writing of the power supply status information 402 has been completed. The process of step S715 corresponds to the process of step S610 illustrated in FIG. 6.

After the process of step S715 is conducted, in step S716, the CPU 206 reads the power supply status information 402 from the data set 400 for wireless power supply. After the process of step S716 is conducted, in step S717, the CPU 206 conducts a process for updating the predetermined data 403b. After the process of step S717 is conducted, in step S718, the CPU 206 acquires the second update data 403a through use of the first update data 402a, to thereby update the second update data 403a. The predetermined data 403b and the second update data 403a that have been updated are written to the data set 400 for wireless power supply as the power receiving status information 403. The process of step S716, step S717, and step S718 corresponds to the process of step S612 illustrated in FIG. 6.

After the process of step S714 is conducted, when the communication unit 105 receives the response data to the second command in step S719, the communication unit 105 notifies the CPU 107 that the writing of the power supply status information 402 has been completed (when YES in step S510).

After the process of step S719 is conducted, in step S720, the CPU 107 controls the timer 107a so as to measure a time that has elapsed since the CPU 107 is notified by the communication unit 105 that the writing of the power supply status information 402 has been completed. After the process of step S720 is conducted, in step S721, the CPU 107 determines that the predetermined time has elapsed since the CPU 107 is notified by the communication unit 105 that the writing of the power supply status information 402 has been completed (when YES in step S511).

After the process of step S721 is conducted, in step S722, the CPU 107 controls the communication unit 105 so as to transmit the third command in order to request the electronic device 200 for the power receiving status information 403. The process of step S722 corresponds to the process of step S512 illustrated in FIG. 5. After the process of step S722 is conducted, in step S723, the third command is transmitted to the electronic device 200.

When the communication unit 204 receives the third command, in step S724, the power receiving status information 403 read from the data set 400 for wireless power supply is transmitted to the power supply apparatus 100 by the communication unit 204 as the response data to the third command.

After the process of step S724 is conducted, in step S725, the communication unit 204 notifies the CPU 206 that the reading of the power receiving status information 403 has been completed.

After the process of step S724 is conducted, in step S726, when the communication unit 105 receives the power receiving status information 403, the communication unit 105 notifies the CPU 107 that the reading of the power receiving status information 403 has been completed.

After the process of step S726 is conducted, in step S727, the CPU 107 determines whether or not the power receiving status information 403 acquired from the electronic device 200 has been updated. The process of step S727 corresponds to the process of step S514 illustrated in FIG. 5. After the process of step S727 is conducted, in step S728, the CPU 107 determines that the power receiving status information 403 has been updated by the electronic device 200 (when YES in step S514). After the process of step S728 is conducted, in step S729, the CPU 107 conducts a process for changing power to be output from the power supply antenna 106 from the first power to the second power. The process of step S729 corresponds to the process of step S517 illustrated in FIG. 5.

The CPU 107 is configured to return to the process of step S712 when the power supply time has elapsed since the process of step S729 is conducted. The CPU 107 may be configured to return to the process of step S701 when the power supply time has elapsed since the process of step S729 is conducted.

After the process of step S729 is conducted, in step S730, the second power is output to the electronic device 200 through the power supply antenna 106. After the process of step S730 is conducted, the CPU 206 conducts the process of step S731. In step S731, when the CPU 206 determines that the second power is being output from the power supply apparatus 100, the CPU 206 controls the regulator 205 to supply power received by the power receiving antenna 201 to at least one of the battery 209 and the system unit 210.

When power received by the power receiving antenna 201 is supplied from the regulator 205 to the battery 209, the power received by the power receiving antenna 201 is also supplied to the charging unit 208. Therefore, the charging unit 208 charges the battery 209 by using power received by the power receiving antenna 201. Furthermore, when power received by the power receiving antenna 201 is supplied from the regulator 205 to the system unit 210, the CPU 206 uses power supplied from the regulator 205 to cause the system unit 210 to conduct capturing of image data, recording of image data, and the like.

In this manner, the power supply apparatus 100 in the first exemplary embodiment is configured to control the timing to request the electronic device 200 for the power receiving status information 403 on the basis of the time required for updating the power receiving status information 403. In this case, the power supply apparatus 100 controls the communication unit 105 so as to request the power receiving status information 403 after a time during which the update of the power receiving status information 403 is assumed to have been completed has elapsed. In addition, the power supply apparatus 100 controls the communication unit 105 so as not to request the power receiving status information 403 before the time during which the update of the power receiving status information 403 is assumed to have been completed has elapsed.

With this configuration, the power supply apparatus 100 can reduce an occurrence of a case where the electronic device 200 acquires the power receiving status information 403 that has not been updated, which can prevent a situation in which desired power cannot be supplied to the electronic device.

In addition, the power supply apparatus 100 is configured to determine whether or not the power receiving status information 403 received from the electronic device 200 is correct on the basis of the determination result of whether or not the power receiving status information 403 received from the electronic device 200 has been updated by the electronic device 200. When the power receiving status information 403 received from the electronic device 200 has been updated by the electronic device 200, the power supply apparatus 100 determines that the power receiving status information 403 received from the electronic device 200 is correct. When the power receiving status information 403 received from the electronic device 200 has not been updated by the electronic device 200, the power supply apparatus 100 determines that the power receiving status information 403 received from the electronic device 200 is not correct.

With this configuration, the power supply apparatus 100 can control power to be wirelessly supply to the electronic device 200 by using the power receiving status information 403 determined to be correct. Furthermore, the power supply apparatus 100 can be inhibited from erroneously controlling the electronic device 200 by not using the power receiving status information 403 determined to be incorrect.

Accordingly, the power supply apparatus 100 can appropriately control power to be wirelessly supply to the electronic device 200 by using the power receiving status information 403 that has been correctly updated by the electronic device 200.

In the first exemplary embodiment, the power supply apparatus 100 and the electronic device 200 are configured to conduct the wireless communication on the basis of the NFC standard. However, the power supply apparatus 100 and the electronic device 200 may be configured to conduct the wireless communication on the basis of a standard other than the NFC standard. For example, the power supply apparatus 100 and the electronic device 200 may be configured to conduct the wireless communication on the basis of ISO/IEC 18092 standard instead of the NFC standard. The power supply apparatus 100 and the electronic device 200 may be configured to conduct the wireless communication on the basis of a radio frequency identification (RFID) standard instead of the NFC standard. The power supply apparatus 100 and the electronic device 200 may be configured to conduct the wireless communication on the basis of TSO/IEC 1444.3 standard instead of the NFC standard.

Furthermore, the power supply apparatus 100 and the electronic device 200 may be configured to conduct the wireless communication on the basis of TransferJet standard instead of the NFC standard. The power supply apparatus 100 and the electronic device 200 may be configured to conduct the wireless communication on the basis of ISO/IEC 21481 standard instead of the NFC standard. The power supply apparatus 100 and the electronic device 200 may be configured to conduct the wireless communication on the basis of Bluetooth standard or wireless LAN standard instead of the NFC standard.

In the first exemplary embodiment, the power supply apparatus 100 is configured to supply the second power to the electronic device 200 by using the power supply antenna 106 and conduct a communication between the communication unit 105 and the electronic device 200 by using the power supply antenna 106, but the first exemplary embodiment is not limited thereto. For example, the power supply apparatus 100 may separately include the antenna for supplying the second power to the electronic device 200 and the antenna for conducting the communication between the communication unit 105 and the electronic device 200. Therefore, a resonance frequency corresponding to the antenna for supplying the second power to the electronic device 200 and a resonance frequency corresponding to the antenna for conducting the communication between the communication unit 105 and the electronic device 200 may be the same frequency, or may be different frequencies. In this case, the resonance frequency corresponding to the antenna for supplying the second power to the electronic device 200 may be 6.78 MHz, or may be a frequency ranging from 100 KHz to 250 KHz. The resonance frequency corresponding to the antenna for conducting the communication between the communication unit 105 and the electronic device 200 may be any frequency other than 13.56 MHz as long as the frequency conforms to a communication standard of the communication unit 105.

Furthermore, the electronic device 200 is configured to receive power from the power supply apparatus 100 by using the power receiving antenna 201, and conduct communication between the power supply apparatus 100 and the communication unit 204 by using the power receiving antenna 201, but the first exemplary embodiment is not limited thereto. For example, the electronic device 200 may separately include the antenna for receiving the power from the power supply apparatus 100 and the antenna for conducting the communication between the power supply apparatus 100 and the communication unit 204. Therefore, a resonance frequency corresponding to the antenna for receiving the power from the power supply apparatus 100 and a resonance frequency corresponding to the antenna for conducting the communication between the power supply apparatus 100 and the communication unit 204 may be the same frequency, or may be different frequencies. In this case, the resonance frequency corresponding to the antenna for receiving the power from the power supply apparatus 100 may be 6.78 MHz, or may be a frequency ranging from 100 KHz to 250 KHz. The resonance frequency corresponding to the antenna for conducting the communication between the power supply apparatus 100 and the communication unit 204 may be any frequency other than 13.56 MHz as long as the frequency conforms to a communication standard of the communication unit 204.

Another Exemplary Embodiment

The power supply apparatus according to the present invention is not limited to the power supply apparatus 100 described in the first exemplary embodiment. The electronic device according to the present invention is not limited to the electronic device 200 described in the first exemplary embodiment. For example, the power supply apparatus and the electronic device according to the present invention may be realized by a system formed of devices.

Furthermore, various processes and various functions described in the first exemplary embodiment may be realized by a computer program. In this case, the computer program according to the present invention is executable on a computer (including a CPU), and realizes various functions described in the first exemplary embodiment.

It should be understood that the computer program according to the present invention may realize various processes and various functions described in the first exemplary embodiment by using an operating system (OS) or the like operating on the computer.

The computer program according to the present invention is read from a computer-readable recording medium to be executed by the computer. The computer-readable recording medium is a non-transitory storage medium. As the computer-readable recording medium, a hard disk drive, an optical disc, a CD-ROM, a CD-R, a memory card, a ROM, or the like can be used. The computer program according to the present invention may be provided to the computer from an external device through a communication interface to be executed by the computer.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims priority from Japanese Patent Application No. 2015-010665, filed Jan. 22, 2015, which is hereby incorporated by reference herein in its entirety.

What is claimed is:

1. A power supply apparatus comprising:
a power supply unit that wirelessly supplies power to an electronic device;
a communication unit that transmits information related to the power supply apparatus to the electronic device, transmits information for requesting the electronic device for transmitting information related to the electronic device, when a predetermined time has elapsed after the information related to the power supply apparatus is transmitted to the electronic device, and receives the information related to the electronic device from the electronic device; and
a control unit that uses the information related to the electronic device to control power to be wirelessly supply to the electronic device, after the information related to the electronic device is received from the electronic device.

2. The power supply apparatus according to claim 1, wherein information indicating the predetermined time is received from the electronic device by the communication unit.

3. The power supply apparatus according to claim 1, wherein information indicating the predetermined time is received from the electronic device by the communication unit before the information related to the power supply apparatus is transmitted to the electronic device.

4. The power supply apparatus according to claim 1, wherein the information for requesting the electronic device for transmitting information related to the electronic device is transmitted to the electronic device, when the predetermined time is elapsed after the information related to the power supply apparatus is transmitted to the electronic device.

5. The power supply apparatus according to claim 1, wherein the information related to the power supply apparatus includes information indicating whether or not an error has occurred in the power supply apparatus, information indicating a maximum value of power that the power supply apparatus is allowed to output, or information indicating a power supply method supported by the power supply apparatus.

6. The power supply apparatus according to claim 1, wherein the information related to the electronic device includes information indicating whether or not an error has occurred in the electronic device, information for requesting the power supply apparatus for increasing or decreasing power to be output from the power supply apparatus, information indicating a remaining capacity of a battery connected to the electronic device, or information related to charging of the battery.

7. The power supply apparatus according to claim 1, wherein the control unit controls whether to cause the power supply unit to output first power or to cause the power supply unit to output second power that is higher than the first power, based on whether or not the information related to the electronic device is updated by the electronic device.

8. The power supply apparatus according to claim 1, wherein the control unit causes the power supply unit to output second power that is higher than first power, after the information related to the electronic device is updated by the electronic device.

9. The power supply apparatus according to claim 8, wherein the control unit causes the power supply unit to output the first power, before the information related to the electronic device is updated by the electronic device.

10. A method comprising:
wirelessly supplying power from a power supply apparatus to an electronic device;
transmitting information related to the power supply apparatus to the electronic device;
transmitting information for requesting the electronic device for transmitting information related to the electronic device, when a predetermined time has elapsed after the information related to the power supply apparatus is transmitted to the electronic device;
receiving the information related to the electronic device from the electronic device; and
using the information related to the electronic device to control power to be wirelessly supply to the electronic device, after the information related to the electronic device is received from the electronic device.

11. A non-transitory storage medium that stores a program for causing a computer to execute a method, the method comprising:

wirelessly supplying power from a power supply apparatus to an electronic device;
transmitting information related to the power supply apparatus to the electronic device;
transmitting information for requesting the electronic device for transmitting information related to the electronic device, when a predetermined time has elapsed after the information related to the power supply apparatus is transmitted to the electronic device;
receiving the information related to the electronic device from the electronic device; and
using the information related to the electronic device to control power to be wirelessly supply to the electronic device, after the information related to the electronic device is received from the electronic device.

* * * * *